3,098,061
CRYSTALLINE POLY(VINYL 2-CHLOROETHYL ETHER)
Richard F. Heck, Wilmington, Del., assignor to Hercules Powder Company, Wilmington, Del., a corporation of Delaware
No Drawing. Filed Oct. 5, 1959, Ser. No. 844,220
1 Claim. (Cl. 260—91.1)

This invention relates to polymers of vinyl 2-haloethyl ethers which are characterized by being form-stable, tough polymers of high molecular weight. Many attempts have been made to polymerize vinyl 2-haloethyl ethers, but in every case the polymer has been only a very low molecular weight oil or a cross-linked, highly colored, completely insoluble material of no utility.

Now in accordance with this invention it has been found that vinyl 2-haloethyl ethers can be polymerized to high molecular weight, form-stable, tough polymers. Both high molecular weight, amorphous, rubbery polymers and high molecular weight, highly crystalline polymers have been prepared. Vinyl 2-chloroethyl ether, for example, has been polymerized to a high molecular weight, highly crystalline polymer having a crystalline melting point of 150 to 151° C. The high molecular weight, amorphous poly(vinyl 2-chloroethyl ether) is a tough, rubbery material which is capable of vulcanization by a variety of methods to tough, rubbery products showing superior solvent resistance. Hence, these rubbers may be used wherever solvent-resistant rubbers are required. The highly crystalline poly(vinyl 2-chloroethyl ether) is useful for the preparation of films and fibers which may be oriented. Films prepared from this crystalline polymer are tough, flexible, transparent films of low water absorption and, hence, are useful as protective coatings, packaging, etc.

The new high molecular weight poly(vinyl 2-haloethyl ethers) of this invention and having R.S.V.'s of at least about 0.4 (1% in chloroform at 25° C.) are readily obtained by polymerizing a vinyl 2-haloethyl ether, as for example, vinyl 2-chloroethyl ether, vinyl 2-bromoethyl ether, etc., preferably in an inert liquid organic diluent, using as the catalyst the reaction product obtained by mixing an aluminum alkoxide or aluminum alkyl or aluminum alkyl alkoxide with sulfuric acid. These catalysts may be used as such or they may be further activated by the addition of aluminum trialkyls or complexes thereof with tetrahydrofuran or with metal alkoxides such as aluminum isopropoxide, titanium isopropoxide, etc. Another type of catalyst that is also effective is the reaction product of a metal sulfate such as aluminum sulfate, titanium sulfate, etc., with a metal alkyl or metal alkoxide, as for example, an aluminum trialkyl, aluminum alkoxide, titanium alkoxide, etc. In general, the polymerization is carried out at a temperature of from about −50° C. to about +100° C., preferably about −10° C. to about +50° C., and the amount of catalyst used will generally be within the range of from about 0.01% up to about 10% by weight of the monomer. Suitable diluents for carrying out the polymerization are toluene, methylene chloride, ethyl acetate, heptane, chlorobenzene, benzene, etc.

When the polymerization is carried out as described above, the polymer is readily isolated from the solution or slurry of polymer and diluent by simply removing the diluent by evaporation or other such means. Frequently it is desirable to add a stabilizer as the diluent is removed at an elevated temperature. The polymer may then be purified to remove the catalyst residues by dissolving the polymer in a suitable solvent, such as hot benzene, filtering to remove the insoluble catalyst and then separating the polymer from the so-purified solution.

In some cases both amorphous and crystalline polymers are produced at the same time. The two products are readily separated on the basis of their different solubilities since the amorphous polymer is readily soluble in acetone and the highly crystalline polymer is not.

The following examples will illustrate the preparation of the poly(vinyl 2-haloethyl ethers) in accordance with this invention. All parts and percentages are by weight unless otherwise specified. The molecular weight of the polymers produced in these examples is indicated by the reduced specific viscosity (R.S.V.) given for each. By the term "reduced specific viscosity" is meant the $\eta$ sp/c determined on an 0.1% solution (0.1 g. of the polymer per 100 ml. of solution) of the polymer in chloroform at 25° C. (unless otherwise indicated). Where the melting point is given, it is the temperature at which birefringence due to crystallinity disappears.

*Example 1*

The catalyst used in this and the following examples was prepared by mixing under nitrogen, a solution of aluminum isopropoxide in n-heptane (usually about 1 molar or less) with a given amount of 100% sulfuric acid and shaking the mixture with glass beads at room temperature for 1 to several hours. The catalyst slurry was then stored at −20° C. until used.

A polymerization vessel with a nitrogen atmosphere was charged with 45 parts of anhydrous ethyl acetate, 10 parts of vinyl 2-chloroethyl ether, and 0.198 of triisobutylaluminum, added as an 0.9 M solution of its tetrahydrofuran complex in n-heptane. The reaction mixture was cooled to 0° C., agitated, and an amount of an aluminum isopropoxide-sulfuric acid catalyst (5:1 molar ratio) prepared as described above equivalent to 0.204 part of aluminum isopropoxide was added. The reaction mixture was then agitated for 2 hours at 0° C. and at room temperature for 16 hours, after which the catalyst was inactivated by adding 4 parts of a 1.0 M solution of ammonia in ethanol. The diluents were removed by evaporation under vacuum. The crude polymer that remained was extracted several times with acetone. On evaporating the acetone solution there was obtained a 68% yield of poly(vinyl 2-chloroethyl ether) which was amorphous and rubbery. It had an R.S.V. of 0.43. The acetone-insoluble polymer that remained had an R.S.V. of 0.55 and was shown to be highly crystalline by X-ray.

*Example 2*

Example 1 was repeated except that only half the amount of ethyl acetate was used as diluent, and the crude polymer that remained after removal of the diluents was extracted with ether. There was obtained a 70% yield of amorphous (slightly crystalline by X-ray) rubbery poly(vinyl 2-chloroethyl ether) which had an R.S.V. of 0.39. There was also obtained a 9% yield of ether-insoluble poly(vinyl 2-chloroethyl ether) which had an R.S.V. of 0.62, a melting point of 150° C. and was shown to be highly crystalline by X-ray.

*Example 3*

A polymerization vessel with a nitrogen atmosphere was charged with 65 parts of methylene chloride, 10 parts of vinyl 2-chloroethyl ether, and 0.204 part of aluminum isopropoxide added as an 0.85 M solution in n-heptane. The reaction mixture was cooled to 0° C., agitated, and an amount of an aluminum isopropoxide-sulfuric acid catalyst (5:1 molar ratio) prepared as described above and equivalent to 0.102 part of aluminum isopropoxide was added. Agitation was continued at 0° C. for 2 hours and then at room temperature for 16 hours, after which the catalyst was inactivated by adding 4 parts of a 1 M solution of ammonia in ethanol.

The diluents were removed by evaporation under vacuum and the crude polymer which remained was extracted several times with acetone. The acetone-soluble polymer was isolated and amounted to a 50% conversion of amorphous, rubber-like polymer which had an R.S.V. of 0.91. The acetone-insoluble polymer amounted to a conversion of 49%, had an R.S.V. of 1.26 and was shown to be crystalline by X-ray.

*Example 4*

A polymerization vessel with a nitrogen atmosphere was charged with 34 parts of methylene chloride, 10 parts of vinyl 2-chloroethyl ether, and 0.21 part of aluminum isopropoxide added as a solution in n-heptane. After cooling to 0° C., agitation was begun and an amount of aluminum isopropoxide-sulfuric acid catalyst (molar ratio of 4:1), prepared as described above, equivalent to 0.06 part of aluminum isopropoxide was added. The reaction mixture was agitated at 0° C. for 2 hours and then at 25° C. for 16 hours. The catalyst was inactivated by adding 4 parts of a 1 M solution of ammonia in ethanol, and the diluents were removed under vacuum. The crude polymer remaining was extracted several times with acetone. The acetone-insoluble polymer which remained was shown to be highly crystalline by X-ray and had an R.S.V. of 1.4. The acetone-insoluble polymer was then extracted with methylene chloride, and the methylene chloride-soluble polymer was isolated and found to be highly crystalline by X-ray and had an R.S.V. of 1.40. The acetone solution obtained when the crude polymer was extracted with acetone was evaporated and this polymer was found to be only slightly crystalline by X-ray and had an R.S.V. of 1.40.

*Example 5*

The catalyst used in this example was prepared under nitrogen by mixing 3.5 ml. of an 0.28 M slurry of anhydrous aluminum sulfate in n-heptane with 11 ml. of an 0.9 M solution of triisobutylaluminum-tetrahydrofuran complex in heptane. The catalyst mixture was shaken for 1 hour before use.

A polymerization vessel with a nitrogen atmosphere was charged with 45 parts of anhydrous benzene, 10 parts of vinyl 2-chloroethyl ether, and 0.2 part of triisobutylaluminum added as an 0.9 M solution of its tetrahydrofuran complex in n-heptane. The reaction mixture was cooled to 0° C., agitation was begun, and an amount of the above catalyst slurry equivalent to 0.34 part of aluminum sulfate was added. Agitation was continued at 0° C. for 4 hours and then at room temperature for 16 hours. The catalyst was inactivated by adding 4 parts of a 1 M solution of ammonia in ethanol, after which the diluents were removed by evaporation under vacuum. The crude polymer so obtained was shown to be slightly crystalline by X-ray and had an R.S.V. of 0.64.

*Example 6*

Example 2 was repeated except that the aluminum isopropoxide catalyst used had a molar ratio of 10:1 and had stood at −20° C. for 6 days before using. The acetone-soluble polymer so obtained amounted to a conversion of 79%. It was a tough, rubbery material which was vulcanized to a tough, rubbery product showing superior solvent resistance.

The acetone-insoluble polymer amounted to a conversion of 25%, was highly crystalline by X-ray and had an R.S.V. of 0.74 and a melting point of 150° C. This polymer was molded at 175° C. into a film which had a tensile strength of 1710 p.s.i., a tensile modulus of 33,000 p.s.i., a maximum elongation of 80% and a water absorption of 0.5%.

*Example 7*

A polymerization vessel was charged with 65 parts of methylene chloride, 10 parts of vinyl 2-chloroethyl ether, and 0.1 part of aluminum isopropoxide. After cooling to 0° C., agitation was begun and an amount of a 5.1 aluminum isopropoxide-sulfuric acid catalyst slurry prepared as described in Example 1 equivalent to 0.2 part of aluminum isopropoxide was added. Agitation was continued at 0° C. for 2 hours and then at 25° C. for 16 hours. The catalyst was inactivated and the crude polymer isolated as in the foregoing examples. The acetone-soluble, amorphous poly(vinyl 2-chloroethyl ether) polymer which amounted to about 50% of the total polymer was a rubbery nontacky, form-stable material which had an R.S.V. of 2.4. The acetone-insoluble polymer was highly crystalline. It was then separated into a methylene chloride-soluble and methylene chloride-insoluble fraction (about 50% of each). The methylene chloride-soluble crystalline polymer had an R.S.V. of 3.6 and a crystalline melting point of 148° C. A film formed from it was tough and somewhat rubbery and was unaffected by water or hexane. The methylene chloride-insoluble fraction of the polymer was extracted with boiling dimethylformamide. This hot dimethylformamide-soluble polymer was isolated and found to be highly crystalline by X-ray with a crystalline melting point of 151° C. On analysis it was found to contain 45.21% carbon and 6.78% hydrogen (calculated values are 45.07%, 6.62%, respectively).

What I claim and desire to protect by Letters Patent is:

A crystalline poly(vinyl 2-chloroethyl ether) soluble in boiling dimethylformamide and insoluble in boiling acetone and having a reduced specific viscosity of at least about 0.4 as measured on an 0.1% solution in chloroform at 25° C.

References Cited in the file of this patent

UNITED STATES PATENTS

| | | |
|---|---|---|
| 2,520,959 | Powers | Sept. 5, 1950 |
| 2,683,125 | D'Alelio | July 6, 1954 |
| 2,820,025 | Schildknecht | Jan. 14, 1958 |

OTHER REFERENCES

Eley et al., J. Chemical Society, November 1952, pages 4167–4173.

Miller et al., J. Poly Sci., vol. 44 (1960), pages 391–395.

Miller et al., J. Poly Sci., vol. 55 (1961), pages 643–656.